US011656780B2

(12) United States Patent
Patil et al.

(10) Patent No.: US 11,656,780 B2
(45) Date of Patent: May 23, 2023

(54) INCREASING DATA PERFORMANCE BY TRANSFERRING DATA BETWEEN STORAGE TIERS USING WORKLOAD CHARACTERISTICS

(71) Applicant: International Business Machines Corporation, Armonk, NY (US)

(72) Inventors: Sandeep R. Patil, Pune (IN); Sasikanth Eda, Vijayawada (IN); Abhishek Jain, Baraut (IN); Digvijay Ukirde, Pune (IN)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 16/242,955

(22) Filed: Jan. 8, 2019

(65) Prior Publication Data
US 2020/0218464 A1 Jul. 9, 2020

(51) Int. Cl.
*G06F 3/06* (2006.01)

(52) U.S. Cl.
CPC .......... *G06F 3/0649* (2013.01); *G06F 3/0604* (2013.01); *G06F 3/067* (2013.01); *G06F 3/0659* (2013.01)

(58) Field of Classification Search
None
See application file for complete search history.

(56) References Cited

U.S. PATENT DOCUMENTS

| | | | |
|---|---|---|---|
| 9,626,377 B1* | 4/2017 | Bent | ..................... G06F 16/185 |
| 2011/0001657 A1 | 1/2011 | Fox et al. | |
| 2011/0137870 A1 | 6/2011 | Feder et al. | |
| 2013/0013579 A1 | 1/2013 | Leeds et al. | |
| 2014/0365827 A1 | 12/2014 | Arguelles | |
| 2017/0285978 A1 | 10/2017 | Manasse | |
| 2018/0203614 A1 | 7/2018 | Aronovich et al. | |

OTHER PUBLICATIONS

"Global Namespace The Future of Distributed File Server Management", by Rahul Mehta Jan. 2003 TidalWire (Year: 2003).*
"Introduction to Lustre Architecture", Lustre systems and network administration, Oct. 2017 (Year: 2017).*

(Continued)

*Primary Examiner* — Michael Alsip
(74) *Attorney, Agent, or Firm* — Zilka-Kotab, P.C.

(57) ABSTRACT

A computer-implemented method, according to one embodiment, includes: receiving one or more suggestions which correspond to placement of data in storage, where the one or more suggestions are based on data workload characteristics. The one or more suggestions are used to identify portions of actual data stored in actual storage which correspond to the one or more suggestions. For each of the identified portions of the actual data stored in the first tier, the one or more suggestions is further used to determine whether to transfer the given identified portion of the actual data to the second tier. Moreover, in response to determining to transfer at least one of the identified portions of the actual data to the second tier, one or more instructions are sent to transfer the at least one of the identified portions of the actual data from the first tier to the second tier.

24 Claims, 7 Drawing Sheets

(56) References Cited

OTHER PUBLICATIONS

Rouse, M., "NVMe (non-volatile memory express)," TechTarget, Search Storage, May 2017, 7 pages, retrieved from https://searchstorage.techtarget.com/definition/NVMe-non-volatile-memory-express.
Shaikh, F., "Why are GPUs necessary for training Deep Learning models?" Analytics Vidhya, May 18, 2017, 23 pages, retrieved from https://www.analyticsvidhya.com/blog/2017/05/gpus-necessary-for-deep-learning/.
Yegulalp, S., "Data in, intelligence out: Machine learning pipelines demystified," InfoWorld, Aug. 8, 2018, 4 pages, retrieved from https://www.infoworld.com/article/3198252/machine-learning/data-in-intelligence-out-machine-learning-pipelines-demystified.html.
Jain et al., "GPFS-SNC: An enterprise cluster file system for Big Data," IBM Journal of Research and Development, vol. 57, May-Jul. 2013, pp. 5:1-5:10.
International Search Report and Written Opinion from PCT Application No. PCT/IB2019/060848, dated Apr. 15, 2020.
Examination Report from European Application No. GB21101460.9, dated Aug. 10, 2021.
Patil et al., U.S. Appl. No. 18/106,399, filed Feb. 6, 2023.

\* cited by examiner

INCREASING DATA PERFORMANCE BY TRANSFERRING DATA BETWEEN STORAGE TIERS USING WORKLOAD CHARACTERISTICS

BACKGROUND

The present invention relates to data storage systems, and more specifically, this invention relates to using data workload characteristics to improve information lifecycle management.

Information typically experiences a number of operations during the time that it is maintained in storage. For instance, after being stored in (e.g., written to) storage, portions of data experience a number of read operations and/or modification operations. Different portions of the data are also typically moved (e.g., rewritten) to different locations in storage over time. As storage capacities and data throughputs increase over time, so does the desirability of storage systems which are able to perform these access operations in an efficient manner.

In response, many storage systems implement information lifecycle management (ILM). ILM is a comprehensive approach to managing the flow of the data and/or metadata included in an information system from the point of creation (e.g., initial storage) to the point of deletion. However, conventional ILM schemes have been unable to effectively manage the distribution of information in clustered filesystems. This is particularly true for clustered filesystems in which data is striped across different portions of storage.

SUMMARY

A computer-implemented method, according to one embodiment, includes: receiving one or more suggestions which correspond to placement of data in storage, where the one or more suggestions are based on data workload characteristics. The one or more suggestions are used to identify portions of actual data stored in actual storage which correspond to the one or more suggestions. The actual storage includes: a first tier having two or more shared nodes, and a second tier having at least one shared nothing node. For each of the identified portions of the actual data stored in the first tier, the one or more suggestions is further used to determine whether to transfer the given identified portion of the actual data to the second tier. Moreover, in response to determining to transfer at least one of the identified portions of the actual data to the second tier, one or more instructions are sent to transfer the at least one of the identified portions of the actual data from the first tier to the second tier.

A computer program product, according to another embodiment, includes a computer readable storage medium having program instructions embodied therewith. The program instructions are readable and/or executable by a processor to cause the processor to: perform the foregoing method.

A system, according to another embodiment, includes: a processor, and logic integrated with the processor, executable by the processor, or integrated with and executable by the processor. Furthermore, the logic is configured to: perform the foregoing method.

A computer-implemented method, according to yet another embodiment, includes: analyzing workload characteristics of data stored in a clustered filesystem. The clustered filesystem is implemented in storage which includes a first tier having two or more shared nodes, and a second tier having at least one shared nothing node. Moreover, the first and second tiers are included in a same namespace. The analyzed workload characteristics are used to generate one or more suggestions which correspond to placement of the data in the storage. Moreover, the one or more suggestions are used to transfer at least some of the data in the storage between the first and second tiers.

A system, according to another embodiment, includes: storage which includes a first tier having two or more shared nodes, and a second tier having at least one shared nothing node. Moreover, the first and second tiers are included in a same namespace. The system also includes a processor, and logic integrated with the processor, executable by the processor, or integrated with and executable by the processor. The logic is configured to: analyze, by the processor, workload characteristics of data stored in the storage. The analyzed workload characteristics are further used, by the processor, to generate one or more suggestions which correspond to placement of the data in the storage. Moreover, the one or more suggestions are used, by the processor, to transfer at least some of the data in the storage between the first and second tiers.

Other aspects and embodiments of the present invention will become apparent from the following detailed description, which, when taken in conjunction with the drawings, illustrate by way of example the principles of the invention.

DETAILED DESCRIPTION

Figure 1:
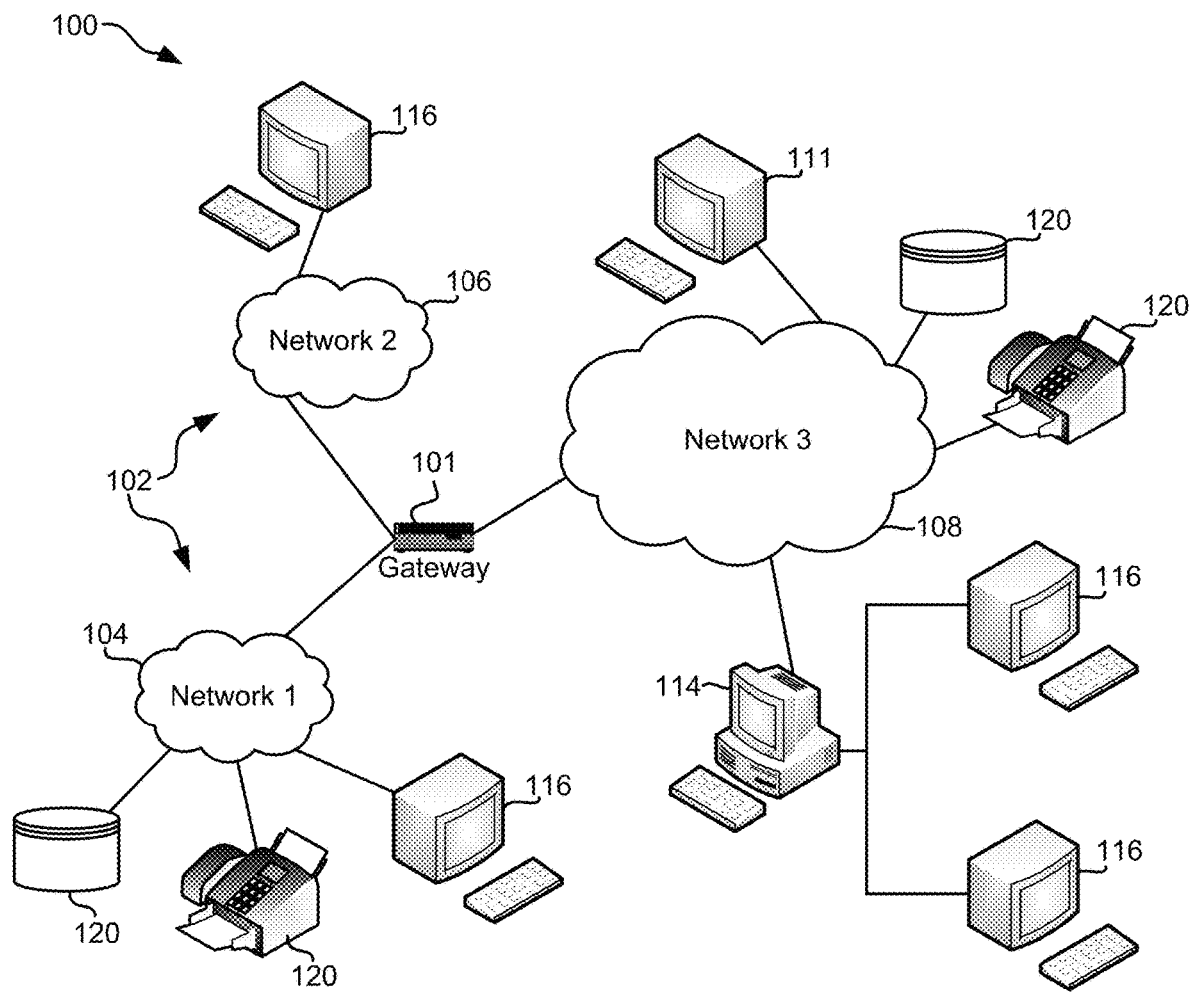
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for achieve a frameworks which are able to support both striping and non-striping storage configurations in a single (same) namespace. Moreover, some of the embodiments herein are able to significantly enhance ILM schemes to appropriately place or migrate data between different tiers, some of which are enabled with special purpose hardware, based on data workload characteristics as well as suggestions and/or data models derived therefrom, e.g., as will be described in further detail below.

In one general embodiment, a computer-implemented method includes: receiving one or more suggestions which correspond to placement of data in storage, where the one or more suggestions are based on data workload characteristics. The one or more suggestions are used to identify portions of actual data stored in actual storage which correspond to the one or more suggestions. The actual storage includes: a first tier having two or more shared nodes, and a second tier having at least one shared nothing node. For each of the identified portions of the actual data stored in the first tier, the one or more suggestions is further used to determine whether to transfer the given identified portion of the actual data to the second tier. Moreover, in response to determining to transfer at least one of the identified portions of the actual data to the second tier, one or more instructions are sent to transfer the at least one of the identified portions of the actual data from the first tier to the second tier.

In another general embodiment, a computer program product includes a computer readable storage medium having program instructions embodied therewith. The program instructions are readable and/or executable by a processor to cause the processor to: perform the foregoing method.

In another general embodiment, a system includes: a processor, and logic integrated with the processor, executable by the processor, or integrated with and executable by the processor. Furthermore, the logic is configured to: perform the foregoing method.

In yet another general embodiment, a computer-implemented method includes: analyzing workload characteristics of data stored in a clustered filesystem. The clustered filesystem is implemented in storage which includes a first tier having two or more shared nodes, and a second tier having at least one shared nothing node. Moreover, the first and second tiers are included in a same namespace. The analyzed workload characteristics are used to generate one or more suggestions which correspond to placement of the data in the storage. Moreover, the one or more suggestions are used to transfer at least some of the data in the storage between the first and second tiers.

In another general embodiment, a system includes: storage which includes a first tier having two or more shared nodes, and a second tier having at least one shared nothing node. Moreover, the first and second tiers are included in a same namespace. The system also includes a processor, and logic integrated with the processor, executable by the processor, or integrated with and executable by the processor. The logic is configured to: analyze, by the processor, workload characteristics of data stored in the storage. The analyzed workload characteristics are further used, by the processor, to generate one or more suggestions which correspond to placement of the data in the storage. Moreover, the one or more suggestions are used, by the processor, to transfer at least some of the data in the storage between the first and second tiers.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
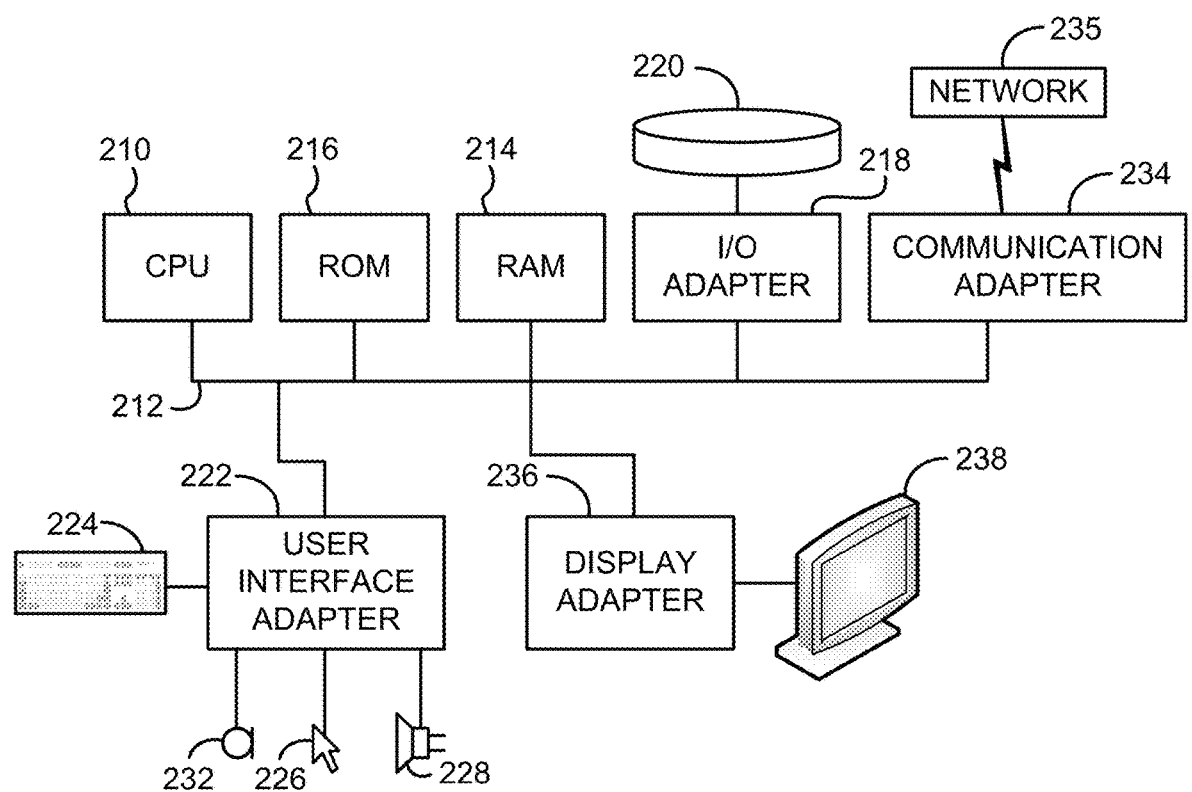
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
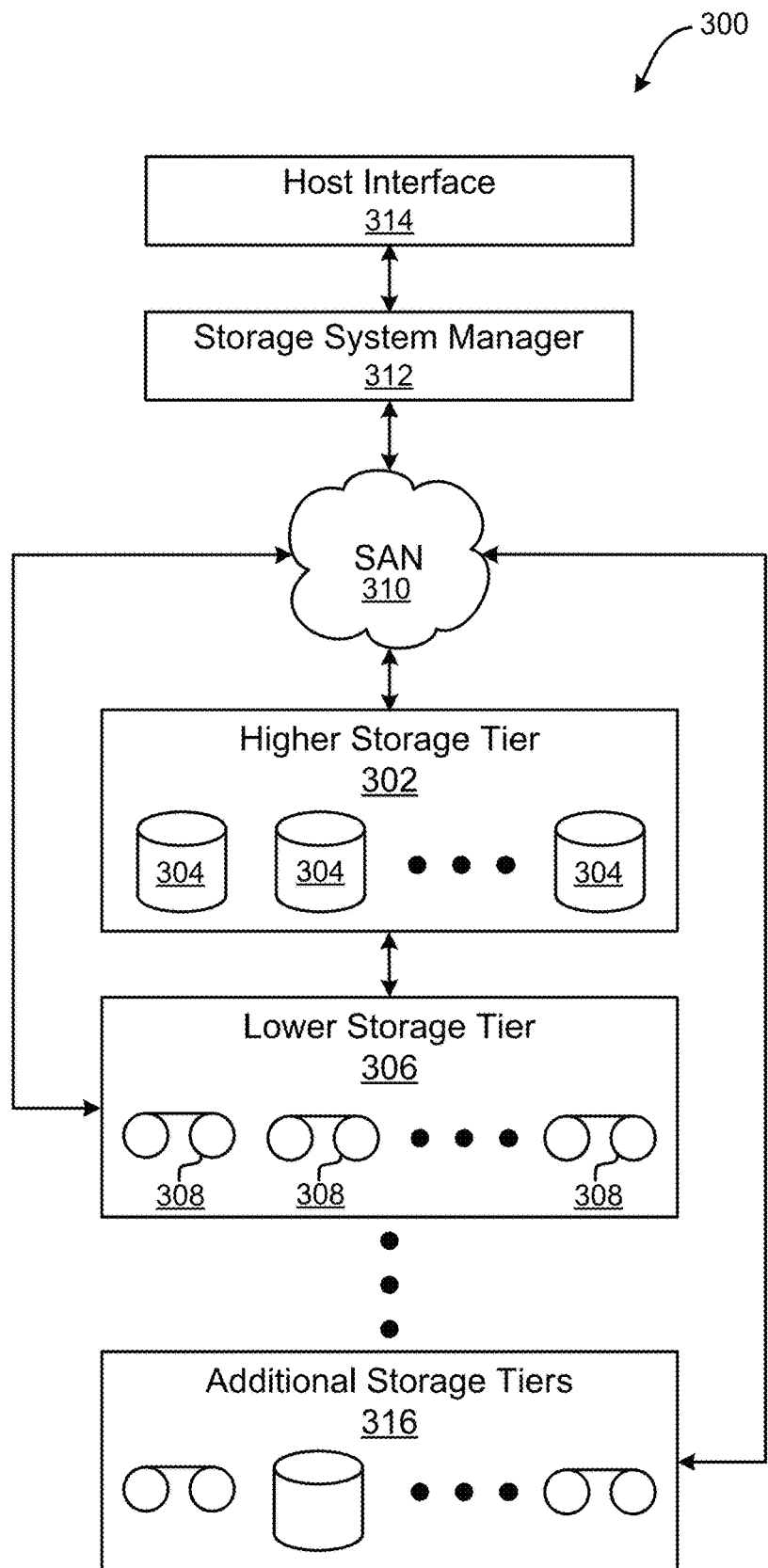
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state storage in solid state drives (SSDs), flash storage, SSD arrays, flash storage arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage media within each storage tier. For example, each data storage tier may include the same type of storage media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, many storage systems implement ILM in order to manage the flow of data and/or metadata included in an information system from the point of creation (e.g., initial storage) to the point of deletion. However, conventional ILM schemes have been unable to effectively manage the distribution of information in clustered filesystems. This is particularly true for clustered filesystems in which data is striped across different portions of storage. For instance, while striping data across different disks of storage increases achievable throughput, it also increases latency in situations which involve recalling each of the fragments from their respective disks, e.g., as will be described in further detail below.

Figure 4:
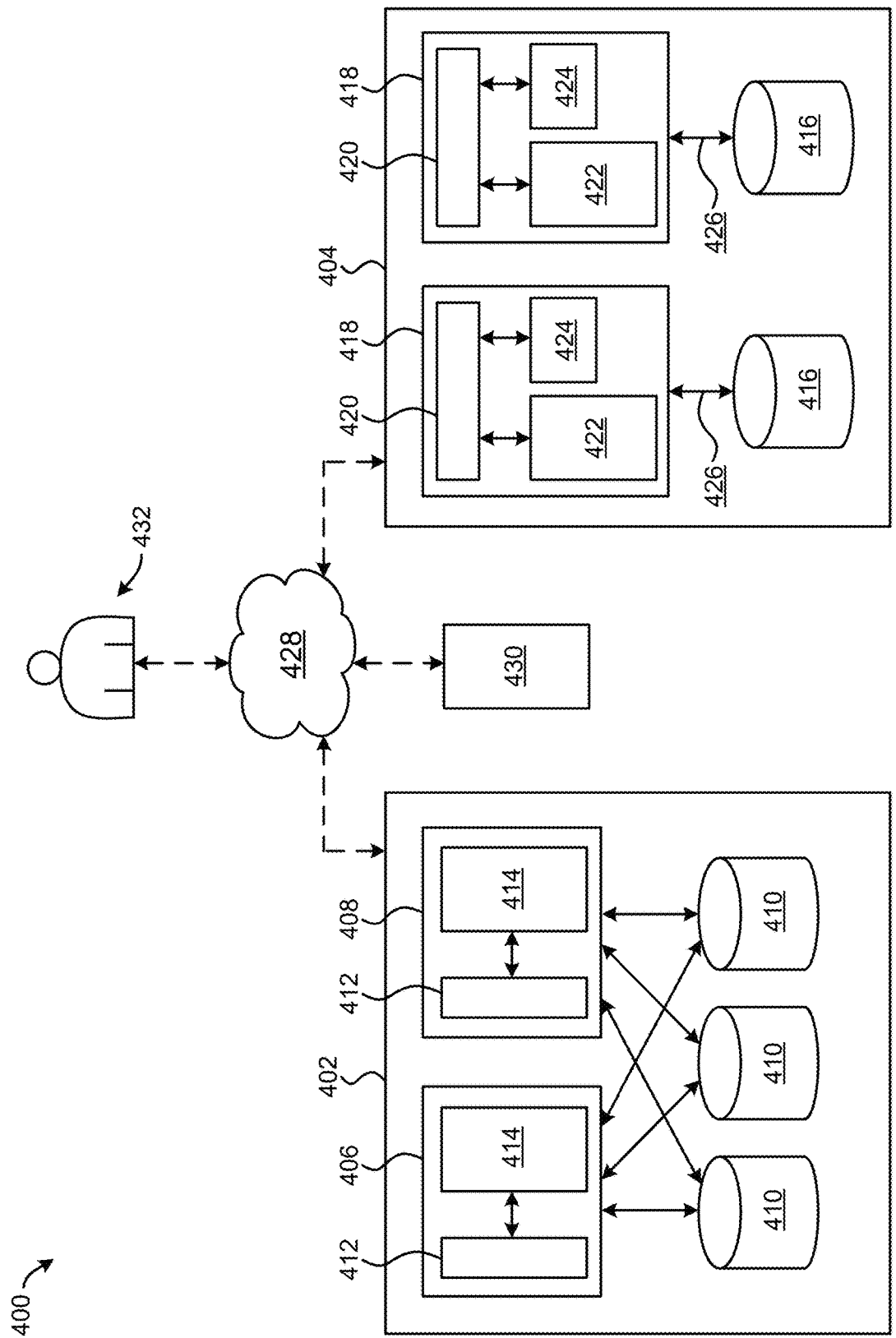
FIG. 4 is a partial representational view of a clustered filesystem in accordance with one embodiment.

Looking to FIG. 4, a representational view of a clustered filesystem 400 is illustrated in accordance with one embodiment. As an option, the present clustered filesystem 400 may be implemented in conjunction with features from any other embodiment listed herein, such as those described with reference to the other FIGS., such as FIG. 3. However, such clustered filesystem 400 and others presented herein may be used in various applications and/or in permutations which may or may not be specifically described in the illustrative embodiments listed herein. Further, the clustered filesystem 400 presented herein may be used in any desired environment. Thus FIG. 4 (and the other FIGS.) may be deemed to include any possible permutation.

As shown, the clustered filesystem 400 includes a first tier 402 and a second tier 404. In preferred approaches, the first and second tiers 402, 404 are included in a same namespace of the clustered filesystem 400. Accordingly, the first and second tiers 402, 404 may be included in a same abstract container or environment created to hold a logical grouping of unique identifiers or symbols, e.g., as would be appreciated by one skilled in the art after reading the present description. Furthermore, a first inode structure which corresponds to the first tier 402 is preferably maintained separately from a second inode structure which corresponds to the second tier 404. However, in some approaches the first and second tiers 402, 404 may each be assigned a unique portion of a combined inode structure.

Looking now specifically to the first tier 402, shared nodes 406, 408 are coupled to each of a number of different storage components 410 which may be of any desired type. For instance, in various approaches any one or more of the storage components 410 may include HDDs, SSDs, magnetic tape libraries, etc., and/or combinations thereof. Thus, in some approaches one or more of the shared nodes 406, 408 may actually be a shared disk node. Each of the shared nodes 406, 408 also include a controller 412 and a portion of storage 414, e.g., which may serve as a cache. It should also be noted that each of the controllers 412 may include or actually be any desired type of processing component(s), e.g., such as a processor, a server, a CPU, etc., depending on the desired approach.

The second tier 404 also includes a number of different storage components 416, each of which are coupled to a respective shared nothing node 418. Each of the shared nothing nodes 418 have a shared nothing architecture which involves a distributed-computing architecture in which each of the nodes 418 is independent and self-sufficient with respect to each other. In some illustrative approaches there is no single point of contention across the second tier 404. Accordingly, the shared nothing nodes 418 do not apportion storage and/or computing resources therebetween, e.g., as would be appreciated by one skilled in the art after reading the present description.

It follows that the first tier 402 is able to stripe data across the storage components 410 using the shared nodes 406, 408, while the second tier 404 is not able to stripe data across the storage components 416 using the shared nothing nodes 418. Again, each of the shared nodes 406, 408 are coupled to each of the different storage components 410 which allows for data to be written to and/or read from any of the storage components 410 by either of the shared nodes 406, 408. As would be appreciated by one skilled in the art, data striping is the technique of segmenting logically sequential data, e.g., such as a file, so that consecutive segments are stored on different physical storage devices. Striping is useful when a processing device requests data more quickly than a single storage device is able to provide it. This is because spreading segments across multiple devices which can be accessed concurrently, increases the total achievable data throughput. Data striping is also a useful process in order to balance I/O loads across an array of storage components. Furthermore, some data striping processes involve interleaving sequential segments of data on storage devices in a round-robin fashion from the beginning of the data sequence.

Conversely, each of the shared nothing nodes 418 have a shared nothing architecture and are thereby unable to implement data striping. Rather, each of the shared nothing nodes 418 implement a data non-striping mode, e.g., such as a general parallel file system for shared nothing clusters (GPFS-SNC) mode. According to an exemplary approach, which is in no way intended to limit the invention, the GPFS-SNC mode involves a scalable file system which operates over a given cluster. It should also be noted that the number of components included in each of the first and second tiers 402, 404 is in no way intended to be limiting. Rather, any desired number of nodes, storage components, etc. may be implemented depending on the desired approach.

While striping modes are desirable in some situations in view of the parallelism they provide, non-striping modes provide benefits as well. For instance, non-striping architectures are able to achieve locality awareness which allows for compute jobs to be scheduled on nodes where the data resides. Metablocks are also implemented which allow for both large and small block sizes to co-exist in the same filesystem, thereby satisfying the requests of different types of applications. Write affinity which allows applications to dictate the layout of files on different nodes in order to maximize both write and read bandwidth is also realized in some approaches. Further still, pipelined replication may be used to increase use of network bandwidth for data replication, while distributed recovery may be utilized to reduce the effect of failures on ongoing computation. It follows that a filesystem which is able to effectively implement striping modes as well as non-striping modes is desirable.

Each of the shared nothing nodes 418 include a controller 420, a portion of storage 422 (e.g., which may serve as a cache in some situations), and special purpose hardware 424. As general data usage and storage capacities continue to increase, any latency associated with performing data access operations is magnified for the system as a whole. This is particularly true for previous clustered filesystems in which data is striped across different portions of storage. For instance, while striping data across different disks of storage may increase achievable throughput, it also increases latency in situations which involve recalling each of the fragments from their respective storage locations.

In order to counteract this latency, some of the embodiments included herein implement special purpose hardware 424. The special purpose hardware 424 is preferably able to increase the speed at which the shared nothing nodes 418 in the second tier 404 are able to perform data operations. In other words, the special purpose hardware 424 effectively increases the speed by which data transfers are performed between each of the shared nothing nodes 418 and the respective storage component 416 coupled thereto. This allows for data to be accessed from the storage components 416 much more quickly, thereby significantly reducing the latency associated with performing read operations, write operations, re-write operations, etc.

An illustrative list of components which may be used to form the special purpose hardware 424 includes, but is in no way limited to, a graphics processing unit (GPU), a SSD cache, an ASIC, a non-volatile memory express (NVMe), etc., and/or combinations thereof. According to an example, which is in no way intended to limit the invention, special purpose hardware 424 which included a GPU may be used to assist in developing machine learning models, e.g., as will be described in further detail below. Moreover, each of the shared nothing nodes 418 may include the same, similar or different special purpose hardware 424 components depending on the desired approach. For instance, in some approaches each of the shared nothing nodes 418 include SSD cache special purpose hardware 424, while in other approaches one of the shared nothing nodes 418 includes SSD cache special purpose hardware 424 and another of the shared nothing nodes 418 includes GPU special purpose hardware 424.

A communication path 426 extending between each of the shared nothing nodes 418 and the respective storage component 416 coupled thereto is also able to accelerate data transfer speeds in some approaches. According to an example, which is in no way intended to limit the invention, a high-speed Peripheral Component Interconnect Express (PCIe) bus serves as the communication path 426 which couples the shared nothing node 418 and the respective storage component 416. Moreover, the special purpose hardware 424 may work in combination with the PCIe bus to accelerate the transfer of data even further.

Referring still to FIG. 4, the first and second tiers 402, 404 are both connected to a network 428. The first and/or second tiers 402, 404 may be coupled to the network 428 using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description. Moreover, the network may be of any type, e.g., depending on the desired approach. For instance, in some approaches the network 428 is a WAN, e.g., such as the Internet. However, an illustrative list of other network types which network 428 may implement includes, but is not limited to, a LAN, a PSTN, a SAN, an internal telephone network, etc. Accordingly, first and second tiers 402, 404 are able to communicate with each other regardless of the amount of separation which exists therebetween, e.g., despite being positioned at different geographical locations.

A central controller 430 and a user 432 (e.g., administrator) are also coupled to the network 428. The central controller 430 is used in some approaches to manage communication between the first and second tiers 402, 404. The central controller 430 may also manage communication between the user 432 and the clustered filesystem 400. According to some approaches, the central controller 430 receives data, operation requests, commands, formatting instructions, etc. from the user 432 and directs the appropriate portions thereof to the first and/or second tiers 402, 404.

Again, as storage capacities and data throughputs increase over time, so does the desirability of storage systems which are able to perform data access operations in an efficient manner. Various ones of the embodiments included herein are able to achieve this desired improvement by implementing a storage architecture which allows for machine learning and/or deep learning algorithms to be applied in an efficient manner. Moreover, performance features which are specific to different tiers in a filesystem may be intelligently utilized to further improve performance in real-time. For instance, looking now to FIG. 5A, a flowchart of a computer-implemented method 500 is shown according to one embodiment. The method 500 may be performed in accordance with the present invention in any of the environments depicted in FIGS. 1-4, among others, in various embodiments. Of course, more or less operations than those specifically described in FIG. 5A may be included in method 500, as would be understood by one of skill in the art upon reading the present descriptions.

Each of the steps of the method 500 may be performed by any suitable component of the operating environment. For example, each of the nodes 501, 502, 503 shown in the flowchart of method 500 may correspond to one or more processors positioned at a different location in a multi-tiered data storage system. Moreover, each of the one or more processors are preferably configured to communicate with each other.

In various embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an ASIC, a field programmable gate array (FPGA), etc., combinations thereof, or any other suitable computing device known in the art.

As mentioned above, FIG. 5A includes different nodes 501, 502, 503, each of which represent one or more processors, controllers, computer, etc., positioned at a different location in a multi-tiered data storage system. For instance, node 501 may include one or more processors which are electrically coupled to a tier of a clustered filesystem (e.g., see 412, 420 of FIG. 4 above). Node 502 may include one or more processors which serve as a central controller of a clustered filesystem (e.g., see 430 of FIG. 4 above). Furthermore, node 503 may include one or more processors which are located at a user location, the user location being in communication with the one or more processors at each of nodes 501 and 503 (e.g., via a network connection). Accordingly, commands, data, requests, etc. may be sent between each of the nodes 501, 502, 503 depending on the approach. Moreover, it should be noted that the various processes included in method 500 are in no way intended to be limiting, e.g., as would be appreciated by one skilled in the art after reading the present description. For instance, data sent from node 502 to node 503 may be prefaced by a request sent from node 503 to node 502 in some approaches.

As shown, operation 504 of method 500 is performed by the one or more processors at node 501. It should again be noted that the one or more processors at node 501 are electrically coupled to a given tier of a clustered filesystem. Accordingly, in some approaches the one or more processors at node 501 include one or more of the controllers 412 in the shared nodes 406, 408. In other approaches, the one or more processors at node 501 include one or more of the controllers 420 in the shared nothing nodes 418. In still other approaches, the one or more processors at node 501 may represent one or more of the controllers 412 in the shared nodes 406, 408 and one or more of the controllers 420 in the shared nothing nodes 418. In other words, the processes performed by the one or more processors at node 501 may be performed by any of the nodes 406, 408, 418 in any of the tiers 402, 404 of the clustered filesystem in FIG. 4 depending on the given approach.

Referring still to method 500, operation 504 includes collecting data workload characteristics which correspond to the data stored in a clustered filesystem. As noted above, the clustered filesystem is implemented in storage which includes a first tier having two or more shared nodes, and a second tier having at least one shared nothing node. In preferred approaches, the first and second tiers of the clustered filesystem are also included in a same namespace.

The data workload characteristics that are collected vary depending on the desired approach. For example, an illustrative list of data workload characteristics that may be collected in operation 504 includes, but is in no way limited to, read and/or write patterns, file types which the data corresponds to, a specific portion of a file that the data corresponds to (e.g., a header, a footer, a metadata section, etc.), etc. According to some approaches, a supervisor assisted learning model may be used to identify the data workload characteristics collected in operation 504, e.g., as would be appreciated by one skilled in the art after reading the present description.

Operation 506 further includes sending the collected data workload characteristics to node 502. Depending on the approach, the data workload characteristics may be sent to node 502 as they are collected, in batches of a predetermined size, periodically, etc.

Moreover, operation 508 includes analyzing the data workload characteristics. The process of analyzing the data workload characteristics varies depending on the number and/or type of workload characteristics which are received. For instance, in different approaches operation 508 may be performed by analyzing the corresponding data types, sizes of data, different read/write patterns, specific access patterns, proposed framework estimates, the type of industry and/or workload from which the clustered filesystem is being used, etc.

The analyzed workload characteristics are then used to generate one or more suggestions and/or data models which correspond to placement of specific portions of data in the storage. See operation 510. For example, in some approaches the suggestions (also referred to herein as "hints") and/or data models correspond to specific workloads. The generated suggestions are even used in some approaches to identify certain machine learning and/or deep learning algorithms which are relevant to the situation, e.g., based on the identified workload. These machine learning and/or deep learning algorithms may be developed over time to describe the data that is actually included in storage and/or the storage location (e.g., node) which the data is stored. Accordingly, the machine learning and/or deep learning algorithms may be updated (e.g., improved) over time using, or at least based on, data workload characteristics.

These generated suggestions are then sent to node 503 for approval in operation 512. A user (e.g., administrator) at node 503 has the ability to accept some, none or all of the generated suggestions. The user at node 503 is also able to propose one or more supplementary suggestions and/or models depending on the approach. Accordingly, decision 514 includes determining whether the generated suggestions are accepted. In response to determining that the generated suggestions are not accepted, method 500 proceeds to operation 516, whereby the user proposes one or more suggestions and/or data models, e.g., as mentioned above. The suggestions and/or data models may be based on machine learning and/or deep learning algorithms run on the clustered filesystem from which the original suggestions were generated.

However, returning to decision 514, method 500 jumps to operation 518 in response to determining that the generated suggestions are accepted. However, it should be noted that operation 516 may be performed for some approaches in which the generated suggestions are accepted. For instance, the user may provide one or more suggestions and/or data models to supplement the generated suggestions.

As shown, operation 518 includes sending a reply to node 502 indicating whether any of the generated suggestions have been accepted. The reply may also include one or more suggestions and/or data models as mentioned above. In response to receiving the reply from node 503, operation 520 is performed. There, operation 520 includes using the one or more approved suggestions and/or data models to transfer at least some of the data in the storage between the first and second tiers. In other words, operation 520 includes applying the suggestions and/or data models to manage the data included in the clustered filesystem. In some approaches, the suggestions and/or data models may also be applied to new data as it is received, e.g., as will be described in further detail below (e.g., see FIG. 5C).

Figure 5A:
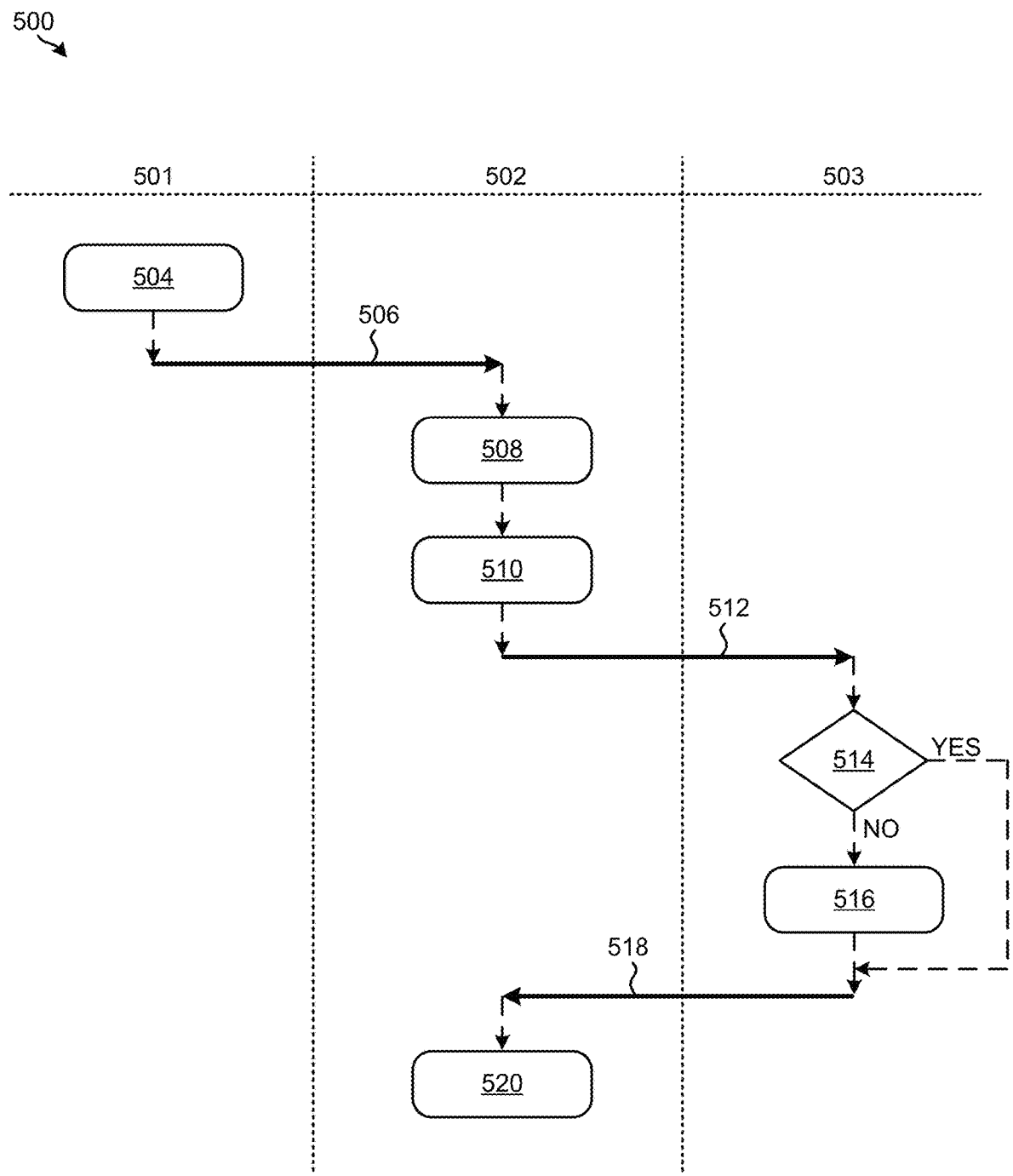
FIG. 5A is a flowchart of a method in accordance with one embodiment.
Figure 5B:
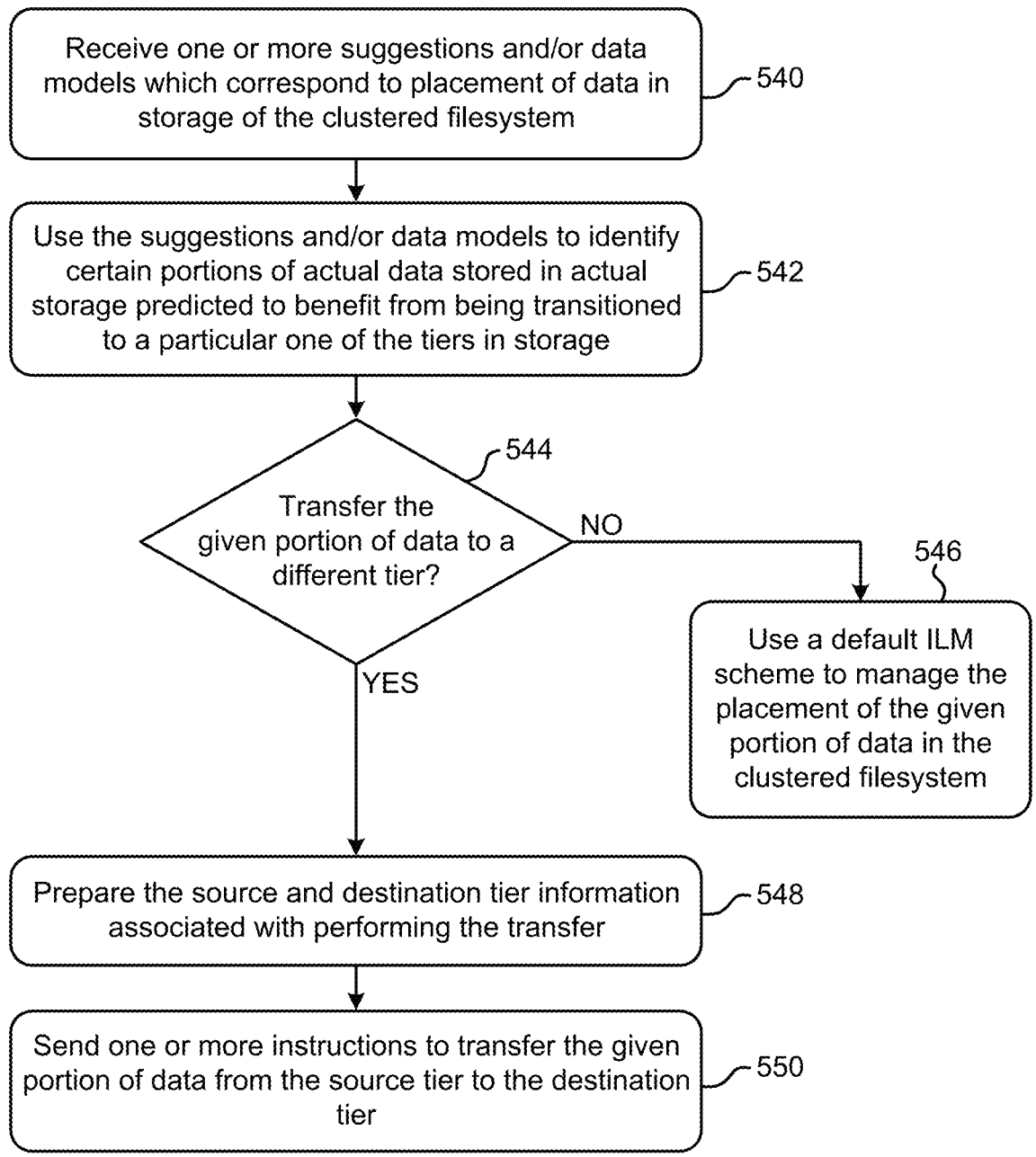
FIG. 5B is a flowchart of a method in accordance with one embodiment.

Referring now to FIG. 5B, exemplary sub-processes of applying the suggestions and/or data models to manage the data included in a prepopulated, clustered filesystem are illustrated in accordance with one embodiment, one or more of which may be used to perform operation 520 of FIG. 5A in some approaches. However, it should be noted that the sub-processes of FIG. 5B are illustrated in accordance with one embodiment which is in no way intended to limit the invention. For instance, although FIG. 5A indicates that the exemplary sub-processes included in FIG. 5B are performed by one or more processors at node 502, any one or more of the sub-processes may actually be performed by any of the other processors in the clustered filesystem. Accordingly, any one or more of the sub-processes included in FIG. 5B may be performed by one or more of the controllers 412, 420 in FIG. 4 above.

With continued reference to FIG. 5B, sub-operation 540 includes receiving one or more suggestions and/or data models which correspond to placement of data in storage of the clustered filesystem. As noted above, the clustered filesystem includes storage which has a first tier with two or more shared nodes therein, and a second tier with at least one shared nothing node therein. The one or more suggestions and/or data models are also based on data workload characteristics. While the data workload characteristics are preferably derived from the storage environment in which the suggestions and/or data models are to be applied, in some approaches one or more of the suggestions and/or data models may be derived using other information. For example, one or more data models compiled using machine learning and/or deep learning algorithms performed on a similar clustered filesystem may be used.

The one or more suggestions and/or data models received in sub-operation 540 are further used to identify certain portions of actual data stored in actual storage predicted to benefit from being transitioned to a particular one of the tiers in storage. See sub-operation 542. For example, a particular portion of data may be identified as having information included therein and/or corresponding thereto which would improve the accuracy of existing machine learning and/or deep learning algorithms. Accordingly, it may be desirable to transition the identified portion of data to one of the shared nothing nodes in the second tier such that special purpose hardware included therein (e.g., such as a GPU) may be used to assist in updating the algorithms using, or at least based on, data workload characteristics associated with the portion of data. According to another example, a portion of data anticipated as having an upcoming data transfer heavy workload may be identified using the suggestions and/or data models. This portion of data is predicted to benefit from being stored in the second tier in view of the upcoming data transfer heavy workload. The prediction is based on both the anticipated data transfer heavy workload and the configuration of the shared nothing nodes in the second tier, which preferably include special purpose hardware that is capable of achieving increased data transfer rates. According to still another example, a portion of data may be identified as being able to provide information valuable for machine learning and/or deep learning algorithms. Thus, the portion of data may be determined as having the potential to improve a custom ILM scheme used to manage the placement of data in the clustered filesystem, e.g., as would be appreciated by one skilled in the art after reading the present description.

For each of the portions of actual data identified in sub-operation 542, an actual determination is made as to whether the given portion data should be transferred to a different tier in storage. See decision 544. According to some approaches, performing decision 544 may actually involve determining the particular configurations of the different tiers in storage and comparing them to the predictions being made using the suggestions and/or data models. For example, a determination may be made as to whether any of the shared nothing nodes in the second tier actually include special purpose hardware. Moreover, for those nodes determined as having special purpose hardware, a further determination may be made as to what levels of performance the special purpose hardware is able to achieve for the given node, e.g., such as increased data transfer rate capabilities.

Similar determinations may be made as to the shared nodes in the first tier. Although the shared nodes may not include added special purpose hardware, the way in which each of the shared nodes are interconnected across the different storage components allows for certain operations to be performed in parallel, thereby achieving higher processing rates than a single shared nothing node may be able to achieve. It follows that while certain portions of data may be predicted to benefit from being stored in the second tier having shared nothing nodes in view of an upcoming data transfer heavy workload, other portions of data may be predicted to benefit from being stored in the first tier in view of an upcoming data processing intensive workload which could thereby be performed by more than one processing component in parallel.

The flowchart of FIG. 5B is shown as proceeding to sub-operation 546 in response to determining that a given portion of data should not be transferred to a different tier in storage. There, sub-operation 546 includes using a default ILM scheme to manage the placement of the given portion of data in the clustered filesystem. As alluded to above, ILM schemes automate the management processes involved with data storage, typically organizing data according to specified policies, and automating data migration from one tier to another based on those criteria. For example, newer data and/or data accessed more frequently is preferably stored on higher performance media, while less critical data is stored on lower performance media. Users may also specify specific storage policies in certain ILM schemes in some approaches.

Returning to decision 544, the flowchart proceeds to sub-operation 548 in response to determining that that a given portion of data should be transferred to a different tier in storage. There, sub-operation 548 includes preparing the source and destination tier information associated with performing the transfer. According to an example, transferring a portion of data stored in the first tier to the second tier involves preparing information which identifies where the portion of data is currently stored in storage (e.g., the logical and/or physical addresses which the portion of data is striped across), a total size of the portion of data, metadata associated with the portion of data, where the portion of data will be stored in the second tier (e.g., the logical and/or physical address), etc.

Furthermore, sub-operation 550 includes sending one or more instructions to transfer (e.g., migrate) the given portion of data from the source tier to the destination tier. The one or more instructions may include the logical address of an intended storage location in the destination tier, or any other information associated with actually performing the data transfer which would be apparent to one skilled in the art after reading the present description.

It should also be noted that this portion of data is also preferably transferred back to the tier which it was previously stored in. This is particularly applicable to portions of data which are transitioned from the first tier to the second tier. Again, the special purpose hardware included in the shared nothing nodes of the second tier provide improved performance, and therefore are preferably reserved for relevant data. According to an example, it is preferred that a portion of data transitioned to a shared nothing node of the second tier to update a running machine learning and/or deep learning algorithm is subsequently transitioned back to the first tier, thereby allowing the special purpose hardware to be used for additional processing.

Again, these sub-processes are performed for each of the portions of data identified in sub-operation 542. Accordingly, any one or more of the sub-processes included in FIG. 5B may be repeated any number of times, e.g., depending on how many portions of data are identified.

Figure 5C:
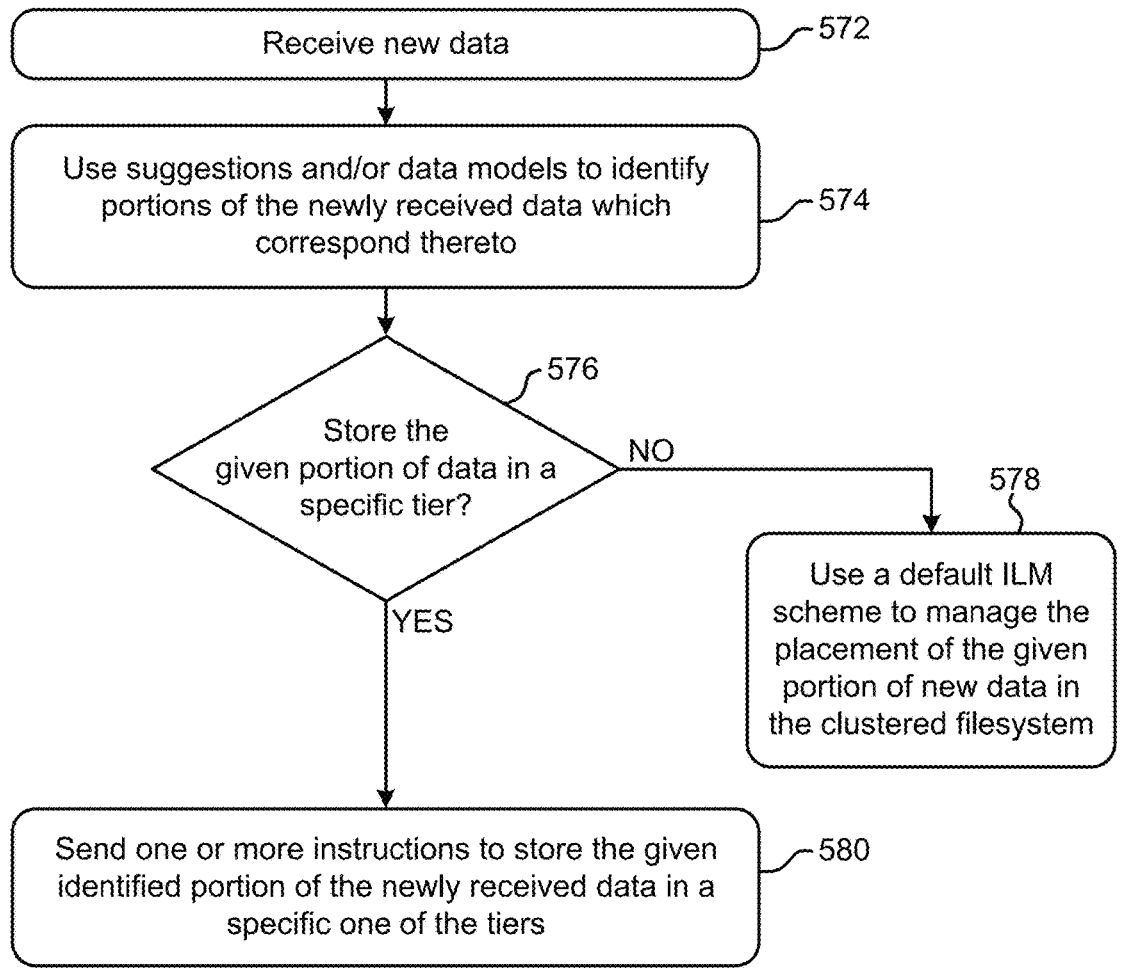
FIG. 5C is a flowchart of a method in accordance with one embodiment.

As mentioned above, the suggestions and/or data models formed using some of the embodiments included herein are also preferably used to manage the process of storing newly received data in storage. For instance, the suggestions and/or data models may be applied to data received from a user, a running application, another filesystem, etc. in order to determine where each portion of the incoming data should be stored in a clustered filesystem. Accordingly, FIG. 5C illustrates a flowchart of a method 570 is shown according to one embodiment. The method 570 may be performed in accordance with the present invention in any of the environments depicted in FIGS. 1-4, among others, in various embodiments. Of course, more or less operations than those specifically described in FIG. 5C may be included in method 570, as would be understood by one of skill in the art upon reading the present descriptions.

Each of the steps of the method 570 may be performed by any suitable component of the operating environment. For example, in various embodiments, the method 570 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 570. Illustrative processors include, but are not limited to, a central processing unit (CPU), an ASIC, a field programmable gate array (FPGA), etc., combinations thereof, or any other suitable computing device known in the art.

As shown in FIG. 5C, operation 572 of method 570 includes receiving new data. Depending on the approach, the data may be received continuously as a stream, in one or more packets, etc. Moreover, operation 574 includes using suggestions and/or data models to identify portions of the newly received data which correspond thereto. According to a specific approach, the suggestions and/or data models are preferably used to identify portions of the newly received data which are predicted to benefit from being stored in a particular tier in storage.

As noted above, the storage of a clustered filesystem in the present embodiment has a first tier with two or more shared nodes therein, and a second tier with at least one shared nothing node therein. The one or more suggestions and/or data models are also based on data workload characteristics. Thus, while certain portions of data may be predicted to benefit from being stored in the second tier having shared nothing nodes in view of an upcoming data transfer heavy workload, other portions of data may be predicted to benefit from being stored in the first tier in view of an upcoming data processing intensive workload which could thereby be performed by more than one processing component in parallel. It follows that any one or more of the approaches described above with respect to performing sub-operation 542 may be implemented in order to perform operation 572, e.g., depending on the approach.

Moreover, for each of the portions of new data identified in operation 574, an actual determination is made as to whether the given portion data should actually be stored in a specific tier in storage. See decision 576. According to some approaches, performing decision 576 may actually involve determining the particular configurations of the different tiers in storage and comparing them to each of the identified portions of new data. For example, a determination may be made as to whether any of the shared nothing nodes in the second tier actually include special purpose hardware. Moreover, for those nodes determined as having special purpose hardware, a further determination may be made as to what performance the special purpose hardware is able to achieve for the given node, e.g., such as increased data transfer rate capabilities.

Similar determinations may also be made as to the shared nodes in the first tier, e.g., according to any of the approaches described herein. For instance, although the shared nodes may not include added special purpose hardware, the way in which each of the shared nodes are interconnected across the different storage components allows for certain operations to be performed in parallel, thereby achieving higher processing rates than a single shared nothing node may be able to achieve. It follows that while certain portions of data may benefit from being stored in the second tier having shared nothing nodes in view of an upcoming data transfer heavy workload, other portions of data may be predicted to benefit from being stored in the first tier in view of an upcoming data processing intensive workload which could thereby be performed by more than one processing component in parallel.

Method 570 proceeds to operation 578 in response to determining that the given portion of new data would not actually benefit from being stored in a particular one of the tiers in storage. There, operation 578 includes using a default ILM scheme to manage the placement of the given portion of new data in the clustered filesystem. According to an example, which is in no way intended to limit the invention, a default ILM scheme may specify that new data is preferably stored on the first tier as a default, with an option to store certain portions of new data on the second tier. This allows for the special purpose hardware included in the second tier to be reserved for relevant portions of data, while managing a remainder of data using the first tier.

However, returning to decision 576, the flowchart proceeds to sub-operation 580 in response to determining that that the given portion of new data would benefit from being stored in a particular one of the tiers in storage. There, sub-operation 580 includes sending one or more instructions to store the given identified portion of the newly received data in a specific one of the tiers. Again, the one or more instructions may include the logical address of an intended storage location for the portion of data, or any other information which would be apparent to one skilled in the art after reading the present description.

According to an example, a particular portion of data may be identified as having one or more specific characteristics which may be used to update a running machine learning and/or deep learning algorithm. The one or more instructions my thereby cause this identified portion of data to be stored in the second tier, e.g., such that special purpose hardware included therein may be used to process the data based on the given approach. According to another example, a determination is made that a portion of new data predicted to have an upcoming data transfer heavy workload would benefit from being stored in the second tier. Specifically, the special purpose hardware in the second tier may provide an increased level of performance which compliments the anticipated upcoming data transfer heavy workload. The portion of new data is thereby preferably stored in the second tier.

However, it should also be noted that portions of data which are stored in the second tier may eventually be transferred the first tier. Again, the special purpose hardware included in the shared nothing nodes of the second tier provide improved performance, and therefore are preferably reserved for relevant data. For instance, it is preferred that a portion of data at a shared nothing node of the second tier being used to update a running machine learning and/or deep learning algorithm is subsequently transitioned back to the first tier, thereby allowing the special purpose hardware to be used for additional processing.

Again, these sub-processes are performed for each of the portions of new data identified in operation 574. Accordingly, any one or more of the processes included in FIG. 5C may be repeated any number of times, e.g., depending on how many portions of data are identified and/or an amount of new data that is received.

It follows that various ones of the embodiments included herein are able to achieve a framework which is able to support both striping and non-striping storage configurations in a single (same) namespace. Moreover, some of the embodiments herein are able to significantly improve the accuracy by which machine learning and/or deep learning algorithms represent the inner workings of a given filesystem. In turn, these improved machine learning and/or deep learning algorithms are able to enhance ILM schemes to appropriately place or migrate data between different tiers in the filesystem, some of which are enabled with special purpose hardware, based on data workload characteristics as well as suggestions and/or data models derived therefrom. Moreover, the inode structures used to interact with tiers implementing striping schemes and those implementing non-striping schemes are maintained separately. Accordingly, the respective replication and reliabilities are configured and maintained separately.

Some of the embodiments included herein are also able to generate and propose suggestions and/or data models based on analysis of the data workload characteristics. This analyses preferably takes data types, amounts of data, read and/or write access patterns, etc. These suggestions and/or data models are thereby able to appropriately migrate the data between different tiers, some of which are enabled with special purpose hardware. Apart from migration, the suggestions and/or data models are also able to assist in developing placement rules for newly created files, newly received data, etc.

This is particularly desirable in comparison to the shortcomings experienced by conventional products. For instance, conventional filesystems have faced challenges in terms of latency which has stemmed from striping data across multiple disks, thereby causing the compute infrastructure to recall all fragments stored across various disks before being able to use the data for actual processing, e.g., by including machine learning and/or deep learning algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   receiving one or more suggestions which correspond to placement of data in storage, wherein the one or more suggestions are based on data workload characteristics;
   using the one or more suggestions to identify portions of actual data stored in actual storage which correspond to the one or more suggestions, wherein the actual storage includes: a first tier having two or more shared nodes, and a second tier having at least one shared nothing node, wherein each of the two or more shared nodes are coupled to a same one or more data storage components in the actual storage, wherein the first tier is configured to stripe data across the two or more shared nodes, with a proviso that the second tier is not configured to stripe data across two or more of the at least one shared nothing node;
   for each of the identified portions of the actual data stored in the first tier, using the one or more suggestions to determine whether to transfer the given identified portion of the actual data to the second tier; and
   in response to determining to transfer at least one of the identified portions of the actual data to the second tier, sending one or more instructions to transfer the at least one of the identified portions of the actual data from the first tier to the second tier.

2. The computer-implemented method of claim 1, wherein each of the at least one shared nothing node in the second tier includes special purpose hardware, wherein the special purpose hardware is a graphics processing unit.

3. The computer-implemented method of claim 2, comprising:
   sending the one or more suggestions to an administrator for approval;
   in response to the administrator approving the one or more suggestions, receiving an indication that the one or more suggestions have been approved;
   in response to the administrator not approving the one or more suggestions, receiving one or more alternative suggestions which correspond to placement of data in storage;
   using the one or more alternative suggestions to identify portions of the actual data stored in the actual storage which correspond to the one or more alternative suggestions;
   for each of the identified portions of the actual data stored in the first tier, using the one or more alternative suggestions to determine whether to transfer the given identified portion of the actual data to the second tier; and
   in response to determining to transfer at least one of the identified portions of the actual data to the second tier, sending one or more instructions to transfer the at least one of the identified portions of the actual data from the first tier to the second tier.

4. The computer-implemented method of claim 1, wherein each of the at least one shared nothing node implement a general parallel file system for shared nothing clusters (GPFS-SNC) mode.

5. The computer-implemented method of claim 1, wherein the first and second tiers are included in a same namespace.

6. The computer-implemented method of claim 1, comprising:
   using the one or more suggestions to identify portions of newly received data which correspond thereto;
   for each of the identified portions of the newly received data, using the one or more suggestions to determine whether to store the given identified portion of the newly received data in the second tier;
   in response to determining to store the given identified portion of the newly received data in the second tier, sending one or more instructions to store the given identified portion of the newly received data in the second tier; and
   in response to determining to not store the given identified portion of the newly received data in the second tier, sending one or more instructions to store the given identified portion of the newly received data in the first tier.

7. The computer-implemented method of claim 1, wherein the data workload characteristics are generated using corresponding file types and/or corresponding portions of a file.

8. A computer program product comprising a computer readable storage medium having program instructions embodied therewith, the program instructions readable and/or executable by a processor to cause the processor to:
   receive, by the processor, one or more suggestions which correspond to placement of data in storage, wherein the one or more suggestions are based on data workload characteristics;
   use, by the processor, the one or more suggestions to identify portions of actual data stored in actual storage which correspond to the one or more suggestions, wherein the actual storage includes: a first tier having two or more shared nodes, and a second tier having at least one shared nothing node, wherein each of the two or more shared nodes are coupled to a same one or more data storage components in the actual storage, wherein the first tier is configured to stripe data across the two or more shared nodes, with a proviso that the second tier is not configured to stripe data across two or more of the at least one shared nothing node;
   for each of the identified portions of the actual data stored in the first tier, use, by the processor, the one or more suggestions to determine whether to transfer the given identified portion of the actual data to the second tier; and
   in response to determining to transfer at least one of the identified portions of the actual data to the second tier, send, by the processor, one or more instructions to transfer the at least one of the identified portions of the actual data from the first tier to the second tier.

9. The computer program product of claim 8, wherein each of the at least one shared nothing node in the second tier includes special purpose hardware, wherein the special purpose hardware is a solid state drive cache, wherein each of the at least one shared nothing node are coupled to a different data storage component in the second tier of the actual storage by a respective Peripheral Component Interconnect Express bus.

10. The computer program product of claim 8, the program instructions readable and/or executable by the processor to cause the processor to:
send, by the processor, the one or more suggestions to an administrator for approval;
in response to the administrator approving the one or more suggestions, receive, by the processor, an indication that the one or more suggestions have been approved, and one or more supplemental suggestions, wherein the one or more supplemental suggestions are used along with the one or more suggestions to identify the portions of actual data stored in the actual storage;
in response to the administrator not approving the one or more suggestions, receive, by the processor, one or more alternative suggestions which correspond to placement of data in storage;
use, by the processor, the one or more alternative suggestions to identify portions of the actual data stored in the actual storage which correspond to the one or more alternative suggestions;
for each of the identified portions of the actual data stored in the first tier, use, by the processor, the one or more alternative suggestions to determine whether to transfer the given identified portion of the actual data to the second tier; and
in response to determining to transfer at least one of the identified portions of the actual data to the second tier, send, by the processor, one or more instructions to transfer the at least one of the identified portions of the actual data from the first tier to the second tier.

11. The computer program product of claim 8, wherein the first and second tiers are included in a same namespace.

12. The computer program product of claim 8, the program instructions readable and/or executable by the processor to cause the processor to:
use, by the processor, the one or more suggestions to identify portions of newly received data which correspond thereto;
for each of the identified portions of the newly received data, use, by the processor, the one or more suggestions to determine whether to store the given identified portion of the newly received data in the second tier;
in response to determining to store the given identified portion of the newly received data in the second tier, send, by the processor, one or more instructions to store the given identified portion of the newly received data in the second tier; and
in response to determining to not store the given identified portion of the newly received data in the second tier, send, by the processor, one or more instructions to store the given identified portion of the newly received data in the first tier.

13. The computer program product of claim 8, wherein the data workload characteristics are generated using corresponding file types.

14. A system, comprising:
a processor; and
logic integrated with the processor, executable by the processor, or integrated with and executable by the processor, the logic being configured to:
receive, by the processor, one or more suggestions which correspond to placement of data in storage, wherein the one or more suggestions are based on data workload characteristics;
use, by the processor, the one or more suggestions to identify portions of actual data stored in actual storage which correspond to the one or more suggestions, wherein the actual storage includes: a first tier having two or more shared nodes, and a second tier having two or more shared nothing nodes, wherein each of the two or more shared nodes are coupled to a same one or more data storage components in the first tier of the actual storage, wherein each of the two or more shared nothing nodes are coupled to a different one or more data storage components in the second tier of the actual storage, wherein the first tier is configured to stripe data across the two or more shared nodes, with a proviso that the second tier is not configured to stripe data across the two or more shared nothing nodes;
for each of the identified portions of the actual data stored in the first tier, use, by the processor, the one or more suggestions to determine whether to transfer the given identified portion of the actual data to the second tier; and
in response to determining to transfer at least one of the identified portions of the actual data to the second tier, send, by the processor, one or more instructions to transfer the at least one of the identified portions of the actual data from the first tier to the second tier.

15. The system of claim 14, wherein each of the two or more shared nothing nodes in the second tier includes special purpose hardware, wherein the special purpose hardware is an application-specific integrated circuit, wherein each of the two or more shared nothing nodes are coupled to the different one or more data storage components in the second tier of the actual storage by a respective Peripheral Component Interconnect Express bus.

16. The system of claim 14, wherein each of the at least one shared nothing node implement an operating mode that involves a scalable file system which operates over the given shared nothing node.

17. The system of claim 14, wherein the first and second tiers are included in a same namespace.

18. The system of claim 14, the logic being configured to:
use, by the processor, the one or more suggestions to identify portions of newly received data which correspond thereto;
for each of the identified portions of the newly received data, use, by the processor, the one or more suggestions to determine whether to store the given identified portion of the newly received data in the second tier;
in response to determining to store the given identified portion of the newly received data in the second tier, send, by the processor, one or more instructions to store the given identified portion of the newly received data in the second tier; and
in response to determining to not store the given identified portion of the newly received data in the second tier, send, by the processor, one or more instructions to store the given identified portion of the newly received data in the first tier.

19. The system of claim 14, wherein the data workload characteristics are generated using corresponding file types, and corresponding portions of a file.

20. A computer-implemented method, comprising:
analyzing workload characteristics of data stored in a clustered filesystem, wherein the clustered filesystem is implemented in storage which includes a first tier having two or more shared nodes, and a second tier having at least one shared nothing node, wherein the first and second tiers are included in a same namespace, wherein each of the two or more shared nodes are coupled to a same one or more data storage components in the actual storage, wherein the first tier is configured to stripe data across the two or more shared nodes, with a proviso that the second tier is not configured to stripe data across two or more of the at least one shared nothing node;
using the analyzed workload characteristics to generate one or more suggestions which correspond to placement of the data in the storage; and
using the one or more suggestions to transfer at least some of the data in the storage between the first and second tiers.

21. The computer-implemented method of claim 20, wherein a first inode structure which corresponds to the first tier is maintained separately from a second inode structure which corresponds to the second tier.

22. The computer-implemented method of claim 20, wherein each of the at least one shared nothing node in the second tier includes special purpose hardware, wherein the special purpose hardware is a non-volatile memory express, wherein each of the at least one shared nothing node implement a general parallel file system for shared nothing clusters (GPFS-SNC) mode, wherein each of the at least one shared nothing node are coupled to a different data storage component in the second tier of the actual storage by a respective Peripheral Component Interconnect Express bus.

23. A system comprising:
storage which includes a first tier having two or more shared nodes, and a second tier having at least one shared nothing node, wherein the first and second tiers are included in a same namespace;
a processor; and
logic integrated with the processor, executable by the processor, or integrated with and executable by the processor, the logic being configured to:
analyze, by the processor, workload characteristics of data stored in the storage;
use, by the processor, the analyzed workload characteristics to generate one or more suggestions which correspond to placement of the data in the storage; and
use, by the processor, the one or more suggestions to transfer at least some of the data in the storage between the first and second tiers,
wherein a first inode structure which corresponds to the first tier is maintained separately from a second inode structure which corresponds to the second tier;
wherein each of the at least one shared nothing node in the second tier includes special purpose hardware, wherein the special purpose hardware is an application-specific integrated circuit, wherein each of the two or more shared nodes are coupled to a same one or more data storage components in the actual storage, wherein the first tier is configured to stripe data across the two or more shared nodes, with a proviso that the second tier is not configured to stripe data across two or more of the at least one shared nothing node, wherein each of the at least one shared nothing node implement a general parallel file system for shared nothing clusters (GPFS-SNC) mode, wherein each of the at least one shared nothing node are coupled to a different data storage component in the second tier of the actual storage by a respective Peripheral Component Interconnect Express bus.

24. The system of claim 23, wherein the logic is configured to:
use, by the processor, the one or more suggestions to identify portions of newly received data which correspond thereto;
for each of the identified portions of the newly received data, use, by the processor, the one or more suggestions to determine whether to store the given identified portion of the newly received data in the second tier;
in response to determining to store the given identified portion of the newly received data in the second tier, sending one or more instructions to store the given identified portion of the newly received data in the second tier; and
in response to determining to not store the given identified portion of the newly received data in the second tier, sending one or more instructions to store the given identified portion of the newly received data in the first tier.

* * * * *